United States Patent [19]
Dewey et al.

[11] Patent Number: 5,442,618
[45] Date of Patent: Aug. 15, 1995

[54] COMMON MODE REJECTION CONTROL IN AN OPTICAL DISK DRIVE

[75] Inventors: Anthony G. Dewey, San Jose, Calif.; Paul H. Francois; Timothy S. Gardner, both of Tucson, Ariz.; Hideaki Iwasaki, Fujisawa, Japan; Morovat Tayefeh, Tucson, Ariz.

[73] Assignee: International Business Machines Corporation, Armonk, N.Y.

[21] Appl. No.: 150,896

[22] Filed: Nov. 12, 1993

[51] Int. Cl.6 .................................................. G11B 7/00
[52] U.S. Cl. .................... 369/124; 369/44.32; 369/54; 369/100; 369/110
[58] Field of Search .................... 369/124, 54, 48, 100, 369/110, 116, 59, 44.32, 44.35, 44.36, 44.41

[56] References Cited

U.S. PATENT DOCUMENTS

| | | | |
|---|---|---|---|
| 4,847,824 | 7/1989 | Davie | 369/124 |
| 4,964,110 | 10/1990 | Horimai et al. | 369/124 |
| 5,105,415 | 4/1992 | Tayefeh | 369/110 |
| 5,132,954 | 7/1992 | Kulakowski et al. | 369/275.3 |
| 5,265,085 | 11/1993 | Jaquette et al. | 369/124 |

Primary Examiner—Joseph A. Popek
Assistant Examiner—Huan Hoang
Attorney, Agent, or Firm—F. E. Anderson

[57] ABSTRACT

An optical drive provides an internal routine for automatically optimizing the common mode rejection ratio of the magneto-optic data output signal. A microprocessor provides control to a controller module which in turn supplies a plurality of calibration signals to a data detecting portion. The calibration signals modify predetermined parameters of the data detecting portion based upon measuring a predetermined parameter indicative of the common mode rejection ratio. The common mode rejection ratio optimization corrects for mismatches in both the optical elements and in the electronic data circuits.

20 Claims, 3 Drawing Sheets

COMMON MODE REJECTION CONTROL IN AN OPTICAL DISK DRIVE

FIELD OF THE INVENTION

The present invention relates generally to optical disk drive systems, and more particularly, to those magneto-optic disk drive systems having the capability to electronically adjust the common mode rejection ratio of the magneto-optic signal.

BACKGROUND OF THE INVENTION

Disk recorders, whether magnetic or optical, are used extensively for storing computer-generated data. Such recorders, having storage capacities in the hundreds of megabytes and beyond, combined with relatively fast data access rates, are especially useful for storing large amounts of computer-generated data requiring repeated accesses. Optical drives, though having generally slower data access rates than their magnetic counterparts, offer higher areal storage densities.

Optical media is of three general types, media which can be read only (ROM), media which can be written only once, and media which can be written, erased, and written again. Write-once media (WORM) is permanently altered when write power levels are produced by the laser beam. Erasable media, such as magneto-optic (MO) media, is not permanently altered when data is written. In the MO media, the magnetic orientation of reactive material therein is altered in the writing process, and in the erasing process, the magnetic orientation is reordered.

In operating an optical disk system, it is necessary to identify the particular sector and track upon which the laser beam is directed. That identification information is included in a sector header stamped onto the disk itself. The user area, that is, the data area, may be either write-once or erasable, but the sector header will always be permanent.

Optical disk drives make use of optical media that react to bursts of light, such as may be produced by the rapid switching of a semiconductor laser. In order to write data on optical media, the laser power must be controlled at a relatively high power level, that is, above a Curie temperature, so that the media can be altered in accordance with an applied directional vertical magnetization which direction corresponds with the desired digits of data to be written thereon. To read data from the optical media, the laser power level is reduced to a level such that the optical media is not altered by the laser beam, but rather a light reflected off the optical media indicates the presence or absence of media alterations, that is, digits of data.

When reading data from MO media, the remnant magnetization of one or the other polarity rotates the linear polarization of a light beam reflected off of the MO media, wherein the light beam is rotated according to the Kerr rotation effect which rotation depends upon the direction of the vertical magnetization. The reflected light is then converted into polarized light creating a p+s and a p−s polarization component. By detecting the p+s and p−s polarization components of the light beam, an MO data signal is generated.

The readback signal is detected differentially for the best signal to noise ratio. Each orthogonal component of the polarized light, p+s and p−s, is focused on a separate photodetector. The MO signal is derived by taking the difference of current or voltage signals generated by the polarized p+s and p−s light signals impinging on each photo detector. One technique for generating the difference signal is to amplify each photocurrent by a current or voltage amplifier, as appropriate, and then determine the difference for MO signal detection, whereby common signal components cancel (e.g. noise components). Thus, substantially only the Kerr rotational signal remains for providing a reading of the stored digital data.

Two highly competitive areas of magneto-optic disk drive design include: increasing areal data density; and improving data access speed. Data density has been improved, in part, by using light having shorter wavelengths (for example, using light in the blue range versus infrared light), and hence decreasing the spot size of the light, used for reading and writing data. Reductions in the light wavelengths may also provide increased data access speeds for a given rotational speed of the MO media since a shorter distance must now be traveled before reaching the next bit of data. However, decreased spot size further strains the optical reading mechanisms such that it becomes difficult to provide a sufficient signal to noise ratio. For example, the optical reading mechanisms typically make use of a half and/or a quarter waveplate that must be accurately adjusted, usually robotically during manufacturing, to properly balance the p+s and p−s light components while still providing an adequate signal to noise ratio to the optical detectors.

Still further increases in speed can be obtained by increasing the rotational speed of the MO media. As continued increases in speed are accomplished, new error components are introduced by the amplifiers used to amplify the voltage or current signals produced by the photodetectors. Such error components include undesirable high frequency errors due to mismatched amplifiers for the p+s and p−s polarizations, respectively. Although it is known to low-pass filter the output signals of the photodetectors to compensate for low frequency noise components, high frequency errors remain uncompensated. At higher frequencies, device mismatches (due to parasitic capacitances and resistances, etc.) which heretofore could be substantially ignored, now present a dominating mismatch factor since further degradations in the signal to noise ratio occur. Such parasitics can introduce an additional +/− five percent error, which combined with the optical errors, may be unacceptable. Simply adjusting the waveplates, therefore, may not be adequate compensation. Even after making adjustments, aging and/or environmental effects can cause further misbalances due to shifts in alignment or parasitic effects.

Accordingly it is desired to provide an apparatus for making adjustments in the p+s and p−s polarization amplifiers to compensate for both optical and electrical effects both in manufacturing and in the field.

SUMMARY OF THE INVENTION

An object of the present invention is to provide an apparatus and method for making an electrical adjustment to reduce common mode noise in a disk drive, which adjustment can be made at manufacturing or in the field.

According to a first embodiment of the present invention, a method for optimizing a common mode rejection ratio in an optical drive is provided, the optical drive including an optical system for focussing light onto an optical disk, a data detecting circuit for reading the light reflected from the optical disk, a microprocessor for controlling the optical system and the data detecting circuit, and a memory for storing an optimization procedure. An operating parameter of the data detecting circuit may be altered according to a common mode rejection ratio setting applied thereto. The method comprises the steps of: (a) initiating a common mode rejection ratio optimization procedure; (b) identifying a performance criteria of the optical drive to be used as a measure of the common mode rejection ratio; (c) measuring the identified performance criteria at a current common mode rejection ratio calibration setting; (d) storing the performance criteria measurement and the associated common mode rejection ratio calibration setting; (e) modifying the common mode rejection ratio calibration setting; (f) repeating steps (c) through (e) until all desired common mode rejection ratio settings have been tested; (g) selecting the common mode rejection ratio calibration setting providing an optimized common mode rejection ratio for storage in the optical drive; and (h) applying the selected common mode rejection ratio calibration setting to the data detecting portion.

In another embodiment of the present invention, an optical disk drive apparatus is capable of CMRR optimization wherein the optical drive includes an optical system for focussing light onto an optical disk, a data detecting portion for reading the light reflected from the optical disk, wherein the data detecting portion includes calibration setting inputs for modifying at least one operating parameter of the data detecting circuit, and a microprocessor for controlling the optical system and the data detecting portion. The optical disk drive includes a controller module coupled to the microprocessor for receiving optimization setting commands from the microprocessor. A first gain amplifier, included in the data detecting portion for amplifying a first polarized light signal, is coupled to the controller module for receiving calibration settings from the controller module. A second gain amplifier for amplifying a second polarized light signal, included in the data detecting portion, is coupled to the controller module for receiving calibration settings from the controller module. A memory is coupled to the microprocessor for storing an optimization procedure such that the microprocessor instructs the controller module to apply differing calibration settings to the first and second gain amplifiers while the microprocessor causes corresponding CMRR measurements to be made until an optimum CMRR measurement is found.

The foregoing and other objects, features, and advantages of the invention will be apparent from the following more particular description of preferred embodiment of the invention, as illustrated in the accompanying drawing.

DETAILED DESCRIPTION

Figure 1:
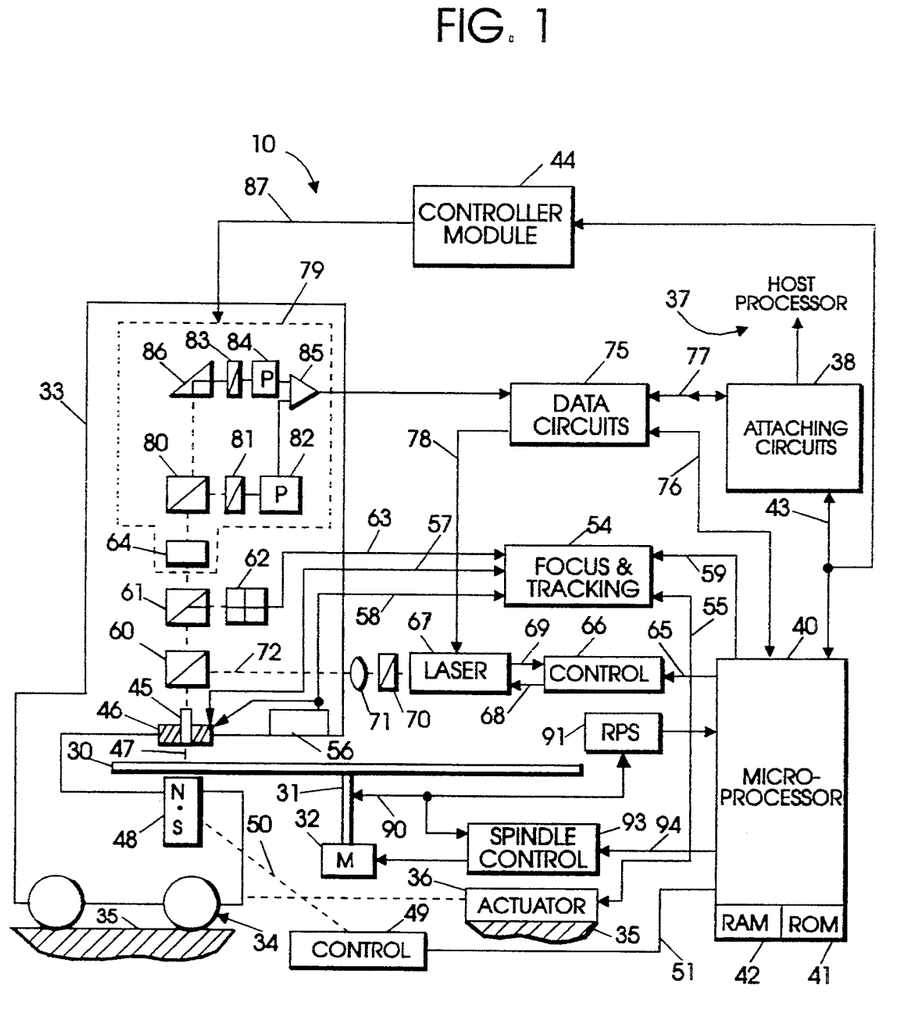
FIG. 1 is a simplified block diagram of an optical disk recorder/player with which common mode rejection control may be advantageously employed.

Referring now more particularly to the appended drawing, like numerals indicate like structural parts and features in the various figures. An optical recorder 10 with which the present invention may be advantageously employed is shown in FIG. 1. A magneto-optic disk 30 (hereinafter referred to as optical disk 30) is mounted on spindle 31 for rotation by motor 32. Optical head-carrying arm 33 on head-arm carriage generally denoted by numeral 34, moves radially of optical disk 30. A frame 35 of optical recorder 10 suitably mounts carriage 34 for reciprocating radial motions. The radial motions of carriage 34 enable access to any one of a plurality of concentric tracks or circumvolutions of a spiral track for recording and recovering data on and from the optical disk 30. Linear actuator 36 suitably mounted on frame 35, radially moves carriage 34 for enabling track accessing. The recorder is suitably attached to one or more host processors 37, which host processors 37 may be control units, personal computers, large system computers, communication systems, image process processors, and the like. Attaching circuits 38 provide the logical and electrical connections between the optical recorder and the attaching host processors 37.

Microprocessor 40 controls the optical recorder 10 including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random access memory (RAM) 42.

The optics of the optical recorder 10 include an objective or focussing lens 45 mounted on head-arm 33 for focussing and tracking motions by fine actuator 46. This actuator 46 includes mechanisms for moving lens 45 toward and away from optical disk 30 for focussing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and optical disk 30.

In magneto-optic recording, magnet 48 (in a constructed embodiment magnet 48 is an electromagnet) provides a weak magnetic steering field for directing the remnant magnetization direction of a small spot on optical disk 30 illuminated by laser light from lens 45. The laser light spot heats the illuminated spot on the optical disk 30 to a temperature above the Curie point of a magneto-optic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on optical disk 30 normally are "north pole remnant magnetization". To erase optical disk 30, magnet 48 rotates so the south pole is adjacent optical disk 30. Magnet 48 control 49, which is mechanically coupled to rotatable magnet 48 as indicated by dashed line 50, controls the write and erase directions. Microprocessor 40 supplies control signals over line 51 to control 49 for effecting reversal of the recording direction.

It is necessary to control the radial position of the beam following path 47, such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, circuits 54 control signals travel over lines 57 and 58, respectively, for focus and fine tracking and switching actions of fine actuator 46. Lines 57 and 58 respectively carry a position error signal to circuits 54 and a position control signal from circuits 54 to the focus and tracking mechanisms of actuator 46. Sensor 56 senses the relative position of fine actuator 46 to head-arm carriage 33.

The focus and tracking position sensing is achieved by analyzing laser light reflected from optical disk 30 over path 47, thence through lens 45, through partial polarizing beam splitter (ppbs) 60 and then through partial polarizing beam splitter 61 to a so-called "quad detector" 62. A focussing element, such as an astigmatic lens (not shown), is typically positioned between the partial polarizing beam splitter 61 and the quad detector 62 as is known to those skilled in the art. Quad detector 62 has four photo elements which respectively supply signals on four lines collectively denominated by numeral 63 to focus and tracking circuits 54. Aligning one axis of the quad detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto optical disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity, laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium arsenide diode laser, can be modulated by data signals so the emitted light beam represents the data to be recorded by intensity modulation. In this regard, data circuits 75 (later described) supply data-indicating signals over line 78 to laser 67 for effecting such modulation. This modulated light beam passes through polarizer 70 (linearly polarizing the beam), thence through collimating lens 71 toward partial polarizing beam splitter 60 for being reflected toward disk 30 through lens 45. Data circuits 75 are prepared for recording by the microprocessor 40 supplied control signals over line 76. Microprocessor 40 in preparing circuits 75 is responding to commands for recording received from a host processor 37 via attaching circuits 38. Once data circuits 75 are prepared, data is transferred directly between host processor 37 to data circuits 75 through attaching circuits 38. Data circuits 75 also includes ancillary circuits (not shown) relating to disk 30 format signals, error detection and correction and the like. Circuits 75, during a read or recovery action, strip the ancillary signals from the readback signals before supplying corrected data signals over bus 77 to host processor 37 via attaching to 38.

Reading or recovering data from optical disk 30 for transmission to a host processor requires optical and electrical processing of the laser light beam from the optical disk 30. That portion of the reflected light (which has its linear polarization from polarizer 70 rotated by optical disk 30 recording using the Kerr effect) travels along the two-way light path 47, through lens 45 and partial polarizing beam splitters 60 and 61 for transmission through optical element 64 and the remaining portion of the data detection portion 79 of the head-arm 33 optics. The optical element 64, for example, a half waveplate, rotates the incident polarization in a manner designed to cause equal light to reach two subsequent detectors. Partial polarizing beam splitter 80 divides the reflected beam into two orthagonal polarization components. The partial polarizing beam splitter 80 reflected light travels through a focussing lens 81 for passing mainly that reflected light which was rotated when the remnant magnetization on optical disk 30 spot being accessed has a "north" or binary one indication. This passed light impinges on photodetector 82 for supplying a suitable indicating signal to differential amplifier 85.

Given perfect operation, a "north" rotated laser light would result in full signal strength from the photodiode 82 and zero signal would be supplied by photodetector 84, and vice versa for a "south" rotated laser light. However, in reality, given a "north" rotated laser light, the photodetector 82 provides a strong signal while the photodetector 84 provides a weak signal. In other words, the photodetector 82 receives more light than the photodetector 84. The opposite of course occurs with a "south" reflected light beam. The amplifier 85 is necessary therefore to determine a difference between the strong and weak signal (and polarity) and supplies the resulting difference signal (data representing) to data circuits 75 for detection. An output of a controller module 44 is connected to the data detection portion 79 via bus 87 (the bus 47 connection could be accomplished by a serial implementation), while an input is connected to the microprocessor 40 by the bus 43. The Module controller 44 allows the microprocessor 40 to control the CMRR of the MO signal at the data detection portion 79 as will be described in more detail below. The detected signals include not only data that is recorded but also all of the so-called ancillary signals as well. The term "data" as used herein is intended to include any and all information-bearing signals, preferably of the digital or discrete value type.

Figure 2:
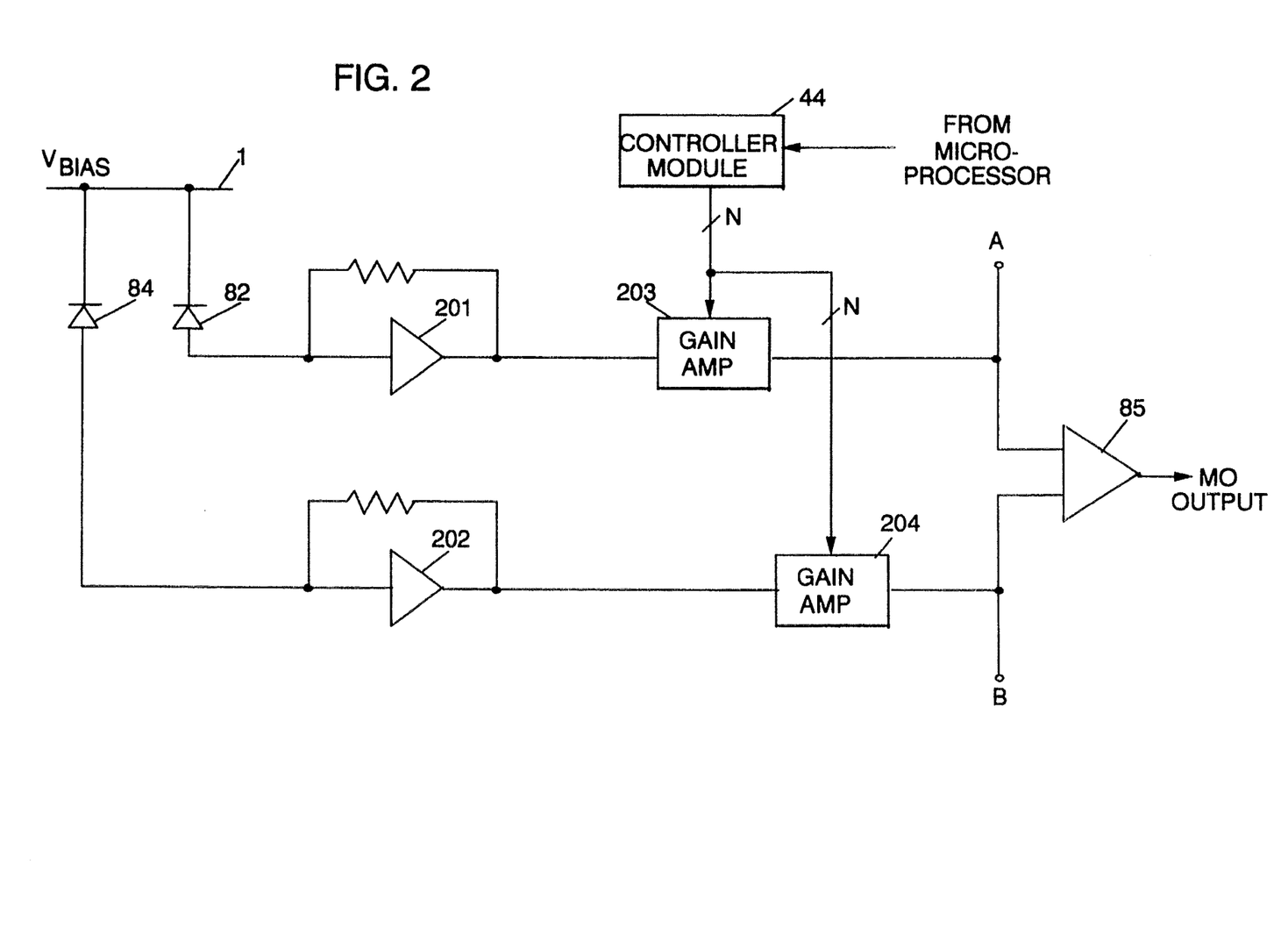
FIG. 2 is a block diagram showing the data detection portion of the optical disk recorder/player of FIG. 1.

Referring now to FIG. 2, a block diagram depicting more detail of the data detection portion 79 according to a preferred embodiment of the present invention is shown. The magneto-optical (MO) output signal produced by the differential amplifier 85 is the difference signal generated by the independently operating photodetectors 82 and 84, wherein each photodetector 82 and 84 receives one component of the reflected light from the optical media 30 (p+s, p−s).

The Photodetectors 82 and 84 each have a cathode connected to a bias voltage, Vbias, and an anode connected to an input of transimpedance amplifier 201 and 202, respectively. The transimpedance amplifiers 201 and 202 could be replaced appropriately by voltage amplifiers without departing from the scope of the invention herein. An output photo current from each photodetector 82 and 84 is amplified by the transimpedance amplifiers 201 and 202, respectively. An output of each transimpedance amplifier 201 and 202 is connected to an input of gain amplifiers 203 and 204, respectively, for further amplification/attenuation. The gain amplifiers 203 and 204 are then each connected to an input of the differential amplifier 85 thus providing the MO output signal.

The photodetectors 82 and 84, the transimpedance amplifiers 201 and 202, and the gain amplifiers 203 and 204, respectively, though matched devices, will actually exhibit some differences in their electrical characteristics (mismatch). This mismatch in electrical characteristics has historically been compensated by the optics, for example, by precisely aligning a position of the optical element 64 (typically within micrometers) at the time of manufacture. This alignment is made to give the best overall common mode rejection ratio (CMRR) for the data path. However, aligning the heads during manufacturing, typically by robotic means, is time consuming and expensive. Advances in manufacturing technology has improved the alignment of the optical element 64 to the point where the optical alignment is within an acceptable +/− five percent range. Given the ability to either match the data detection portion 79 at low frequencies, or accurately compensate for low frequency effects, it is conceivable for manufacturing to actually forego the costly alignment procedure if the optical drive 10 will operate at low frequency (i.e., slower rotation of the optical media 30).

Given the present state of competition for faster data access rates, and hence higher rotational speeds of the optical disk 30, high frequency effects of the electronics can not be ignored given the current +/− five percent optical tolerances. The resulting signal noise due to the optics and the data detection portion 79 would be unacceptable. Therefore, the misbalance of the data detection portion 79 must be compensated. While compensating the data detection portion 79 it is also possible to compensate for misalignment of the optics. One method of compensating for such signal noise involves making an analog adjustment of the gain of one or both gain amplifiers 203 and 204. This adjustment can be realized by tweaking a potentiometer at manufacturing and gluing the potentiometer position when finished. A drawback to such an approach is that aging effects, or replacement of a preamplifier module would require a time consuming and costly manual readjustment.

An alternative to making an analog type adjustment by using an adjustable potentiometer includes using dual in-line pin (DIP) switches having a predetermined number of pins, wherein each DIP switch is connected to the gain amplifiers 203 and 204 for modifying the gain (or other applicable parameter of the data detecting portion 79) of each gain amplifier 203 and 204. For example, each pin of the DIPs could be connected to a varying value of resistance, which resistances could be switched into or out of the gain amplifiers 203, 204 for modifying a resistance value therein which in turn modifies the gain of the associated amplifier. The gain of the gain amplifiers 203 and 204 could thus be programmed for substantially equal signal levels at a predetermined frequency (i.e. a frequency related to the rotational speed of the optical disk 30). Alternatively, other parameters of the gain amplifiers 203 and 204 could be modified for affecting gain, for example, a source current, etc. could be changed. Modification of parameters of the gain amplifiers 203 and 204 can be effected by using a digital to analog converter (DAC) such that the microprocessor 40 can make adjustments digitally while the gain amplifier is modified with an analog signal. The DAC (not shown) is incorporated in the controller module 44 and connected to the gain amplifiers 203 and 204 by the bus 87 (or by a serial connection 87).

If the data detecting portion 79 will be reading data at a known data rate, it is possible to program the gain of the gain amplifiers 203 and 204 for that predetermined frequency. This programming need not be done in-situ, rather the data detecting portion can be programmed and added to the optical drive at a later date. In this case, a modulated light is applied at a known light level and the resulting signals are measured from the gain amplifiers 203 and 204. The gain amplifiers 203 and 204 are then programmed for equal signal strengths at points A and B (FIG. 2), or for a minimum MO output signal from the differential amplifier 85. The programmed data detection portion 79, including the optical element 64 which can be a fixed element, for example, a fixed half waveplate, can be added to the optical disk 10 wherein no further fine tuning is required. This method is advantageous in that the data detection portion 79 can be manufactured and adjusted separately. However, in-situ programming is a more optimum solution since greater accuracy is achieved because the misalignment of other optical elements as well as environmental and/or aging effects can be simultaneously compensated.

Alternatively, a number of other parameters associated with the quality of the MO output data signal from the data circuits 77 can be used for determining an optimum operating point of the gain amplifiers 203 and 204. One parameter that is useful for determining output data signal quality is jitter, wherein jitter is a measurement of an amount of fluctuation, measured in time, due to the edge or peak position of the written marks relative to a clock signal. Another parameter useful for determining output data signal quality is the signal-to-noise ratio (SNR) which is a measurement of the amount of noise present. Still another signal useable for determining output data signal quality is the data detection reliability which is a measurement of a data error rate. While reading data from the optical media 30, the gain of the gain amplifiers 203 and 204 could be set for the optimum CMRR by accordingly adjusting for the lowest jitter, SNR, or data error rate. Since the adjustment herein described operates on the light beam as passing through the optical element 64 (half wave plate) of the remaining data detecting portion 79, the adjustment compensates for any misbalance in the optics of the data detection portion 79.

Calibrating the CMRR of the optical disk 10 according to the recited parameters requires that the optical disk 30 be present or inserted into the optical drive 10. The parameter chosen to be measured for determining the CMRR may either be permanently stamped onto the optical disk 30, for example a test pattern or a 3 T pattern, etc., or calibration data may be written to the optical disk 30 for the express purpose of providing calibration measurements. The precision in which the calibration may be made, depends in part upon the number of lines, n, making up the bus 87. Having n equal to four, i.e., a four bit bus, would provide up to sixteen different calibration settings per gain amplifier 203, 204. The number of lines in the bus 87 may be set according to precision desired.

Calibration can also be performed independently of the optical disk 30, that is, CMRR may be optimized whether the optical disk 30 contains calibration information or not. Optimization independent of calibration data is accomplished by dithering the laser power of the laser 67 (FIG. 1) under control of the microprocessor 40. The controller module 44 steps through predetermined settings of the bits making up the bus 87 for altering the performance of the gain amplifiers 203, 204. Concurrently, the MO output signal from the difference amplifier 85 is monitored. Those settings causing a minimum amplitude signal (minimum CMRR) are saved and retrieved for final optimization.

The above optimizing procedures are conducive to automatic procedures so that the optical drive 10 is self optimizing at final test, or self optimization could be run in the field, or even at every start-up. A procedure for optimizing the optical drive 10 is stored in the microprocessor 40, for example in ROM 41, for stepping the optical drive 10 through the optimization procedure.

Figure 3:
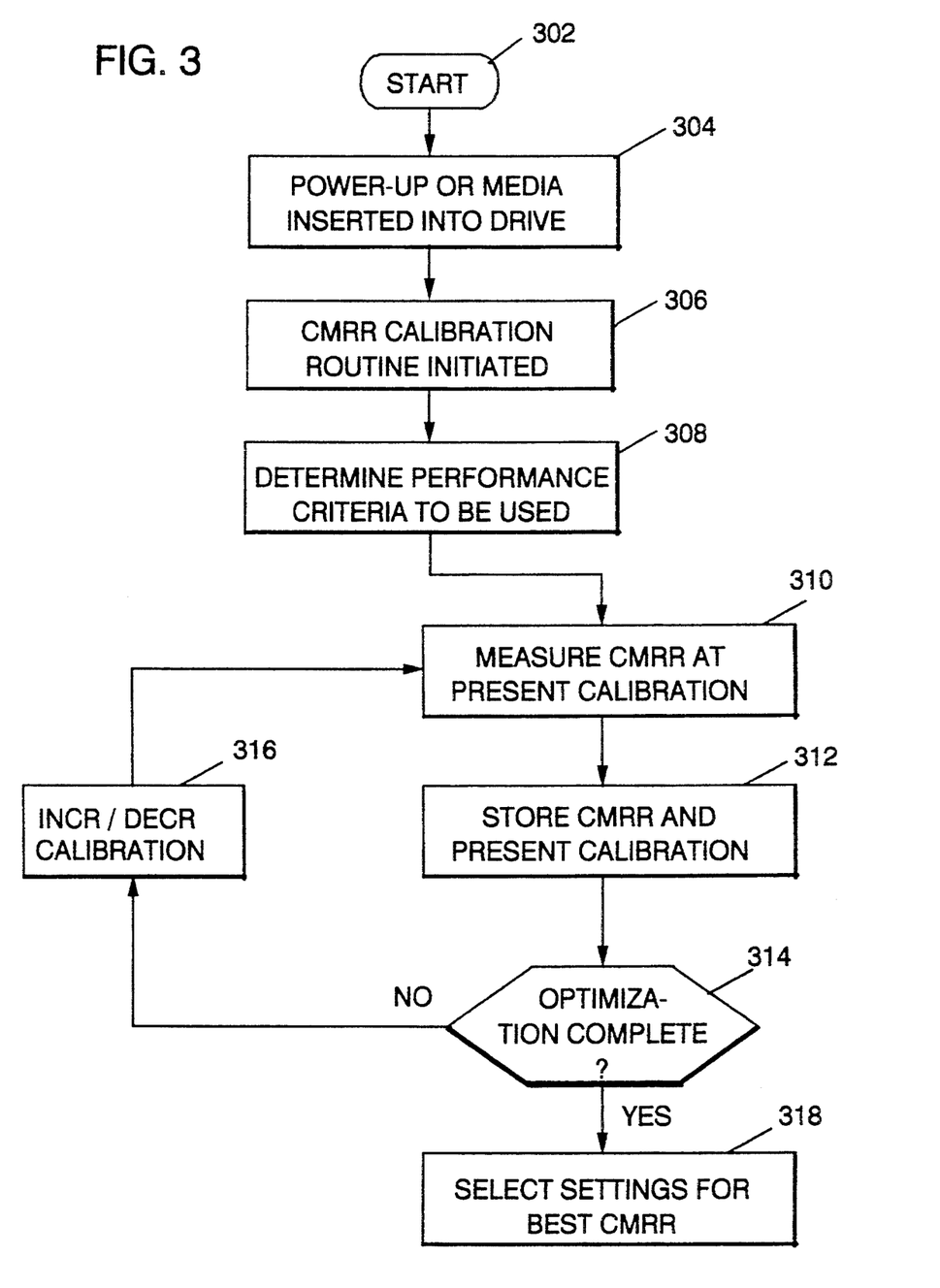
FIG. 3 shows a flow diagram of a method for adjusting the common mode rejection in an optical disk according to a preferred embodiment of the present invention.

FIG. 3 provides a flow chart diagramming the steps for automatically optimizing the CMRR in the optical drive 10. At step 302, upon power-up or upon inserting an optical disk into the optical drive 10, the microprocessor 40 (FIG. 1) is alerted to initiate the CMRR optimization procedure at step 304. A parameter for measurement is chosen at step 306. The measurement parameter could include the following: measuring jitter; measuring SNR; measuring the data error rate, or dithering the laser beam and measuring the MO output signal strength. The particular performance criteria to be used is determined either in advance as written in microcode stored in the ROM 401, or may be determined according to attributes relating to the optical drive 10. If the performance criteria is a predetermined criteria, for example, writing a control track to the optical disk 10, then such a control track is written at step 308. If the performance criteria is determined according to attributes of the optical drive 10 or optical disk 30, then the microprocessor 40 makes the determination, for example, the optical disk 30 may have a control track pre-stamped thereon. The control track may included a 3 T (or other pattern, etc.) track as is known to those skilled in the art. If a prestamped track is used, then a lowest amplitude MO output signal test is made. Whichever method is chosen, at step 310 the microprocessor 40 will read the control track and make the measurement accordingly.

Step 312 includes storing the measurement result with the associated calibration setting in RAM 41, in EPROM (not shown), or to the optical disk 30. A test is made at step 314 to determine whether all desired combinations of calibration settings have been attempted. Step 312 could be a simple counter that determines whether all possible combinations have been tried, or may be a more sophisticated routine which directs calibration according to a direction that the measurements results are taking. If more combinations remain to be tried, then at step 316 the next calibration setting is made by the controller module 44. Steps 310 through 316 is repeated until the optimization is completed. The calibration setting providing the best results is retrieved from memory and that setting is remembered and applied via the controller module 44.

Optical disks can be optimized for the best CMRR wherein both alignment errors and errors introduced by high frequency parasitic effects are minimized. The optimization can be accomplished manually by setting DIP switches for minimum noise or the optimization can be performed automatically by the optical drive.

Such optimization makes faster data access rates more reliable by reducing the common mode noise at higher frequencies. Additionally, substantial savings can be realized by foregoing time consuming and costly robotic adjustments of the optical elements. Effects of aging and environmental factors can also be dealt with by optimizing the optical drive at later times.

The instant invention, in addition to providing in-situ calibratoin, also provides for external calibration of the data detecting portion 79 (data detecting circuit). The data detecting circuit includes an electrically alterable parameter for compensating signal misbalances. The data detecting circuit includes a first photodetector for providing a first photo signal indicative of a magnitude of a first light detected by the first photodetector, and a second photodetector for providing a second photo signal indicative of a magnitude of a second light detected by the second photodetector. An optical element, typically a fixed half waveplate, for rotating an incident polarization for causing the first and second lights to reach the first and second photo detectors, respectively, is provided. A first photo signal amplifier is coupled to the first photodetector for amplifying the first photo signal, and a second photo signal amplifier is coupled to the second photodetector for amplifying the second photo signal. A first gain amplifier is coupled to the first photo signal amplifier, the first gain amplifier having a calibration setting input for modifying a first operating parameter therein. A second gain amplifier is coupled to the second photo amplifier and to the second input of the differential amplifier, the second gain amplifier having a calibration setting input for modifying a second operating parameter therein. A differential amplifier having a first input coupled to an output of the first gain amplifier, and a second input coupled to the output of the gain amplifier, provides a MO output signal. The data detecting circuit has a modulated light signal is applied to the optical element and the first and second operating parameters are modified so that a minimum MO signal is produced.

While the invention has been particularly shown and described with reference to preferred embodiments thereof, it will be understood by those skilled in the art that various changes in form and details may be made therein without departing from the spirit and scope of the invention. A single embodiment of an optical disk drive has been set forth herein, but many variations in the tracking, focusing, and data detection are known and can be substituted without departing from the invention set forth. A number of performance criteria may also be used as testing the CMRR, as long as such performance criteria produces accurate results at the frequency of interest. The optimization may occur during test, at each start-up, or as initiated by a user or technician. Additional calibration of the optical element, for example, the half-wave or quarter-wave plate may be pursued before optimization or a fixed wave plate may be used.

What is claimed is:

1. A method for optimizing a common mode rejection ratio in an optical drive, the optical drive including an optical system for focussing light onto an optical disk, a data detecting circuit for reading the light reflected from the optical disk, and a microprocessor for controlling the optical system and the data detecting circuit, wherein an operating parameter of the data detecting circuit is altered according to a common mode rejection ratio calibration setting applied thereto, and a memory for storing an optimization procedure, the method comprising steps of:

(a) initiating a common mode rejection ratio optimization procedure;

(b) identifying a performance criteria of the optical drive to be used as a measure of the common mode rejection ratio;

(c) measuring the identified performance criteria at a current common mode rejection ratio calibration setting;

(d) storing the performance criteria measured in step (c) and the associated common mode rejection ratio calibration setting;

(e) modifying the common mode rejection ratio calibration setting;

(f) repeating steps (c) through (e) until all desired common mode rejection ratio calibration settings have been tested;

(g) selecting the common mode rejection ratio calibration setting providing an optimized common mode rejection ratio for storage in the optical drive; and (h) applying the selected common mode rejection ratio calibration setting to the data detecting circuit.

2. The method according to claim 1 wherein step (a) is performed each time the optical drive is powered-up.

3. The method according to claim 1 wherein step (b) further includes a step (i) for writing a control track to the optical disk according to the identified performance criteria to be used.

4. The method according to claim 3 wherein the identified performance criteria provides an indication of high frequency parasitic effects present in the data detecting circuit.

5. The method according to claim 4 wherein the identified performance criteria used to determine the common mode rejection ratio is jitter.

6. The method according to claim 4 wherein the identified performance criteria used to determine the common mode rejection ratio is a signal to noise ratio.

7. The method according to claim 4 wherein the identified performance criteria used to determine the common mode rejection ratio is a data error rate.

8. The method according to claim 4 wherein the identified performance criteria used to determine the optimized common mode rejection ratio is a modulated light level.

9. The method according to claim 1 further comprising a step (j) of storing the optimization procedure in memory.

10. An optical disk drive apparatus capable of common mode rejection ratio (CMRR) optimization including an optical system for focussing light onto an optical disk, a data detecting portion for reading the light reflected from the optical disk, wherein the data detecting portion includes calibration setting inputs for modifying at least one operating parameter of the data detecting portion, and a microprocessor for controlling the optical system and the data detecting portion, the optical disk drive comprising:

a controller module coupled to the microprocessor for receiving optimization setting commands from the microprocessor;

a first gain amplifier, included in the data detecting portion for amplifying a first polarized light signal, the first gain amplifier coupled to the controller module for receiving calibration settings from the controller module;

a second gain amplifier for amplifying a second polarized light signal, included in the data detecting portion, the second gain amplifier coupled to the controller module for receiving calibration settings from the controller module;

a first memory coupled to the microprocessor for storing an optimization procedure such that the microprocessor instructs the controller module to apply differing calibration settings to the first and second gain amplifiers while the microprocessor causes corresponding CMRR measurements to be made until an optimum CMRR measurement is found.

11. The optical disk drive apparatus according to claim 10 further comprising a second memory for storing the differing calibration settings and their corresponding CMRR measurements.

12. The optical disk drive apparatus according to claim 11 wherein the data detecting portion further comprises a differential amplifier for having first and second inputs coupled to an output of the first and second gain amplifiers respectively, wherein an output of the differential amplifier is measured by the microprocessor for determining the CMRR measurement.

13. The optical disk drive apparatus according to claim 12 wherein the data detection portion further comprises a fixed half wave plate.

14. The optical disk drive apparatus according to claim 12 wherein the optimization procedure includes a jitter measurement for determining the CMRR.

15. The optical disk drive apparatus according to claim 12 wherein the optimization procedure includes a signal to noise ratio measurement for determining the CMRR.

16. The optical disk drive apparatus according to claim 12 wherein the optimization procedure includes a data error rate measurement for determining the CMRR.

17. A data detecting circuit for use in an optical disk drive, wherein the data detecting circuit includes an electrically alterable parameter for compensating signal misbalances, the data detecting circuit comprising:

a first photodetector for providing a first photo signal indicative of a magnitude of a first light detected by the first photodetector;

a second photodetector for providing a second photo signal indicative of a magnitude of a second light detected by the second photodetector;

an optical element for rotating an incident polarization for causing the first and second lights to reach the first and second photo detectors, respectively;

a first photo signal amplifier coupled to the first photodetector for amplifying the first photo signal;

a second photo signal amplifier coupled to the second photodetector for amplifying the second photo signal;

a first gain amplifier coupled to the first photo signal amplifier, the first gain amplifier having a calibration setting input for modifying a first operating parameter therein;

a differential amplifier having a first input coupled to an output of the first gain amplifier, and a second input coupled to an output of the second photo signal amplifier, the differential amplifier providing a magneto-optic (MO) output signal.

18. The data detecting circuit according to claim 17 further comprising a second gain amplifier coupled between the second photo amplifier and the second input of the differential amplifier, the second gain amplifier having a calibration setting input for modifying a second operating parameter therein.

19. The data detecting circuit according to claim 18 wherein the optical element is a fixed half waveplate.

20. The data detecting circuit according to claim 19 wherein a modulated light signal is applied to the optical element and the first and second operating parameters are modified so that a minimum MO signal is produced.

* * * * *